(12) United States Patent
Kim et al.

(10) Patent No.: US 6,256,129 B1
(45) Date of Patent: Jul. 3, 2001

(54) PORTABLE COMPUTER AND METHOD OF AUTOMATICALLY CONTROLLING DIRECTION OF INFRARED SIGNAL TRANSMISSION AND RECEPTION

(75) Inventors: Jae-Wook Kim; Chun-Soo Lee, both of Suwon (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/050,063

(22) Filed: Mar. 30, 1998

(30) Foreign Application Priority Data

Mar. 28, 1997 (KR) .................................................. 97-11217
May 7, 1997 (KR) .................................................. 97-17488

(51) Int. Cl.[7] .................................................. H04B 10/00
(52) U.S. Cl. .......................... 359/159; 359/152; 359/153; 359/172; 359/163
(58) Field of Search .................................. 359/152, 159, 359/163, 153, 172

(56) References Cited

U.S. PATENT DOCUMENTS

| | | | | |
|---|---|---|---|---|
| 4,180,306 | * | 12/1979 | Duhrkoop et al. ...................... | 350/6.4 |
| 5,065,455 | * | 11/1991 | Ito et al. .............................. | 359/159 |
| 5,099,346 | | 3/1992 | Lee et al. . | |
| 5,142,400 | * | 8/1992 | Solinksy .............................. | 359/159 |
| 5,247,380 | | 9/1993 | Lee et al. . | |
| 5,282,073 | * | 1/1994 | Defour et al. ........................ | 359/159 |
| 5,309,564 | | 5/1994 | Bradley et al. . | |
| 5,426,529 | | 6/1995 | Zelenka . | |
| 5,440,559 | | 8/1995 | Gaskill . | |
| 5,528,391 | * | 6/1996 | Elrod ..................................... | 359/36 |
| 5,564,020 | | 10/1996 | Rossi . | |
| 5,566,022 | * | 10/1996 | Segev .................................... | 359/172 |
| 5,592,320 | * | 1/1997 | Wissinger ............................. | 359/159 |
| 5,636,264 | | 6/1997 | Sulavuori et al. . | |
| 5,668,977 | | 9/1997 | Swanstrom et al. . | |
| 5,682,157 | | 10/1997 | Asmussen et al. . | |
| 5,682,379 | | 10/1997 | Mahany et al. . | |
| 5,684,614 | * | 11/1997 | Degura ................................. | 359/172 |
| 5,724,168 | * | 3/1998 | Oschmann et al. .................. | 359/172 |
| 5,818,188 | * | 10/1998 | Hirai et al. ........................... | 318/480 |
| 5,861,968 | * | 1/1999 | Kerklaan et al. ..................... | 359/152 |
| 5,877,880 | * | 3/1999 | Kuo ...................................... | 359/159 |
| 5,986,787 | * | 11/1999 | Ohshima et al. ..................... | 359/159 |
| 6,008,923 | * | 12/1999 | Samdahl et al. ..................... | 359/172 |
| 6,040,934 | * | 3/2000 | Ogusu et al. ......................... | 359/152 |

* cited by examiner

Primary Examiner—Leslie Pascal
Assistant Examiner—Hanh Phan
(74) Attorney, Agent, or Firm—Robert E. Bushnell, Esq.

(57) ABSTRACT

A portable computer for wireless communication with peripheral devices over an infrared communication link. The portable computer is capable of automatically controlling an infrared signal direction for greater data transfer efficiency over the infrared communication link. The portable computer includes an input/output controller for outputting infrared signal transmission data according to an input command, receiving infrared signal reception data, and outputting an infrared refraction control signal according to whether the infrared signal reception data is received; an infrared signal transmitter for transmitting an infrared transmission signal according to the infrared signal transmission data to the peripheral device over the infrared communication link; an infrared signal receiver for receiving an infrared reception signal from the peripheral device and outputting the infrared signal reception data; and an infrared signal direction controller for controlling the direction of the infrared transmission signal to the peripheral device, and the direction of the infrared reception signal according to the infrared refraction control signal.

10 Claims, 11 Drawing Sheets

PORTABLE COMPUTER AND METHOD OF AUTOMATICALLY CONTROLLING DIRECTION OF INFRARED SIGNAL TRANSMISSION AND RECEPTION

CLAIM FOR PRIORITY

This application makes reference to, incorporates the same herein, and claims all benefits accruing under 35 U.S.C. §119 from an application for PORTABLE COMPUTER AND METHOD OF AUTOMATICALLY CONTROLLING DIRECTION OF INFRARED SIGNAL TRANSMISSION AND RECEPTION earlier filed in the Korean Industrial Property Office on the $28^{th}$ of March and the $5^{th}$ of May 1997, and there duly assigned Ser. Nos. 11217/1997 and 17488/1997, a copy of which application is annexed hereto.

BACKGROUND OF THE INVENTION

1. Technical Field

The present invention relates to a portable computer for automatically controlling direction of infrared signal direction for transmission and reception, and more particularly, relates to a portable computer and method for automatically controlling the direction of an infrared beam for convenient and effective wireless data communication between the portable computer and peripheral devices.

2. Related Art

Computer systems which typically include a display unit, input devices such as a keyboard, a central processing unit (CPU) and data storage devices (e.g., floppy or hard disk drive), are now used in practically every aspect of modern life. Computer systems are available in all shapes, sizes, and vary greatly in terms of function, power and speed. Likewise, peripheral devices such as printers, modems, graphics, scanners, text scanners, code readers, magnetic card readers, monitors, voice command interfaces, external storage devices, keyboards etc... are becoming increasingly ubiquitous. Both the computer systems and peripheral devices have become dramatically smaller and more portable such as those laptops, notebooks and even hand held computers.

Despite the reduction in computer size, the computer system still must physically interface with the peripheral devices. Dedicated cable is still necessary to physically connect the computer system to each peripheral device for data communication. If there are many peripheral devices for use with the computer system, there must be as many cables connected to the computer system. The physical cable connections between the computer system and peripheral devices can be costly and inconvenient. Moreover, the computer system and peripheral devices are also bound by their physical locations.

One recent solution to eliminate the use of cables for connecting the computer system, particularly portable computer, to peripheral devices as well as to other computer systems is to establish wireless infrared communication via a wireless area network as disclosed, for example, in U.S. Pat. Nos. 5,099,346 and 5,247,380 for Infrared Communication Network issued to Lee et al., U.S. Pat. No. 5,440,559 for Portable Wireless Communication Device issued to Gaskill, U.S. Pat. No. 5,564,020 for Apparatus For Reducing Interference Between A Computer Device And A Radio Transceiver Utilizing Separated Units With An Infrared Link issued to Rossi, U.S. Pat. No. 5,636,264 for Radio Telephone System Which Utilizes An Infrared Signal Communication Link issued to Sulavuori, U.S. Pat. No. 5,668,977 for Dockable Computer System Capable Of Electric And Electromagnetic Communication issued to Swanstrom et al., U.S. Pat. No. 5,682,157 for Frequency-Alternating Synchronized Infrared issued to Asmussen et al., and U.S. Pat. No. 5,682,379 for Wireless Personal Local Area Network issued to Mahany et al. Generally, both the computer system and peripheral devices contain respective infrared transceiver units for data communication over an infrared communication link. No longer is the user required to keep the computer system within cable length distance of the appropriate connection. Portable computer is free to move anywhere within the wireless area.

We have observed however, that most portable computers using conventional infrared transceiver units for communication with peripheral devices require the user to manually control the direction and the position of the transceiver contained in each computer for data transmission and reception. This is because the transceiver of each peripheral device can receive an infrared signal only when it is within an infrared range of the portable computer. The difficulty for the user to manually control the receiving direction of an infrared signal is even more profound when the distance between the transmitter and the receiver of the portable computer and peripheral devices is far extended.

SUMMARY OF THE INVENTION

Accordingly, it is therefore an object of the present invention to provide a portable computer and peripheral devices for wireless data communication over an infrared (IR) communication link.

It is also an object to provide a portable computer and process of automatically controlling infrared (IR) signal direction relative to peripheral devices or other electronic devices for efficient data transmission and reception.

It is also an object to provide a portable computer and peripheral devices for automatically controlling an infrared (IR) signal direction for wireless data communication over an infrared (IR) communication link.

These and other objects of the present invention can be achieved by a portable computer for wireless communication with peripheral devices over an infrared communication link. The portable computer comprises an input/output controller for outputting infrared signal transmission data according to an input command, receiving infrared signal reception data, and outputting an infrared refraction control signal according to whether the infrared signal reception data is received; an infrared signal transmitter for transmitting an infrared transmission signal according to the infrared signal transmission data to the peripheral device over the infrared communication link; an infrared signal receiver for receiving an infrared reception signal from the peripheral device and outputting the infrared signal reception data; and an infrared signal direction controller for controlling the direction ofthe infrared transmission signal to the peripheral device, and the direction of the infrared reception signal according to the infrared refraction control signal. The infrared signal direction controller comprises a prism for refracting the infrared transmission signal and the infrared reception signal; and a prism driver for changing the direction of the prism according to the infrared refraction control signal. The prism driver further comprises a motor for changing the direction of the prism, and a motor controller for driving the motor according to the infrared refraction control signal.

According to another aspect of the present invention, a method for controlling an infrared signal direction in a computer system having an infrared signal direction controller for performing transmission/reception operations with external devices by controlling the infrared signal direction automatically, comprising the steps of: determining whether a transmission/reception operation of an infrared signal is performed through the infrared signal direction controller; controlling the infrared signal direction controller to rotate the transmission/reception direction of the infrared signal at a certain degree when the infrared signal is not transmitted/received over an infrared communication link between the computer system and the external devices; and performing the transmission/reception operation of the infrared signal when the infrared signal is transmitted/received over the infrared communication link between the computer system and the external devices.

Still, another aspect of the present invention, a method for controlling an infrared signal transmission/reception direction in a computer system having an infrared signal direction controller for performing transmission/reception operations with external devices by controlling the infrared signal direction automatically, comprising the steps of: controlling the infrared signal direction controller to control the direction of the infrared signal until the transmission/reception operation of the infrared signal is performed; storing a first position in which the transmission/reception operation of the infrared signal is performed; controlling the infrared signal direction controller to change the direction of the infrared signal until the transmission/reception operation of the infrared signal is stopped; storing a second position in which the transmission/reception operation of the infrared signal is stopped; and controlling the infrared signal direction controller to ensure the direction of the infrared signal be positioned between the first position and the second position.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
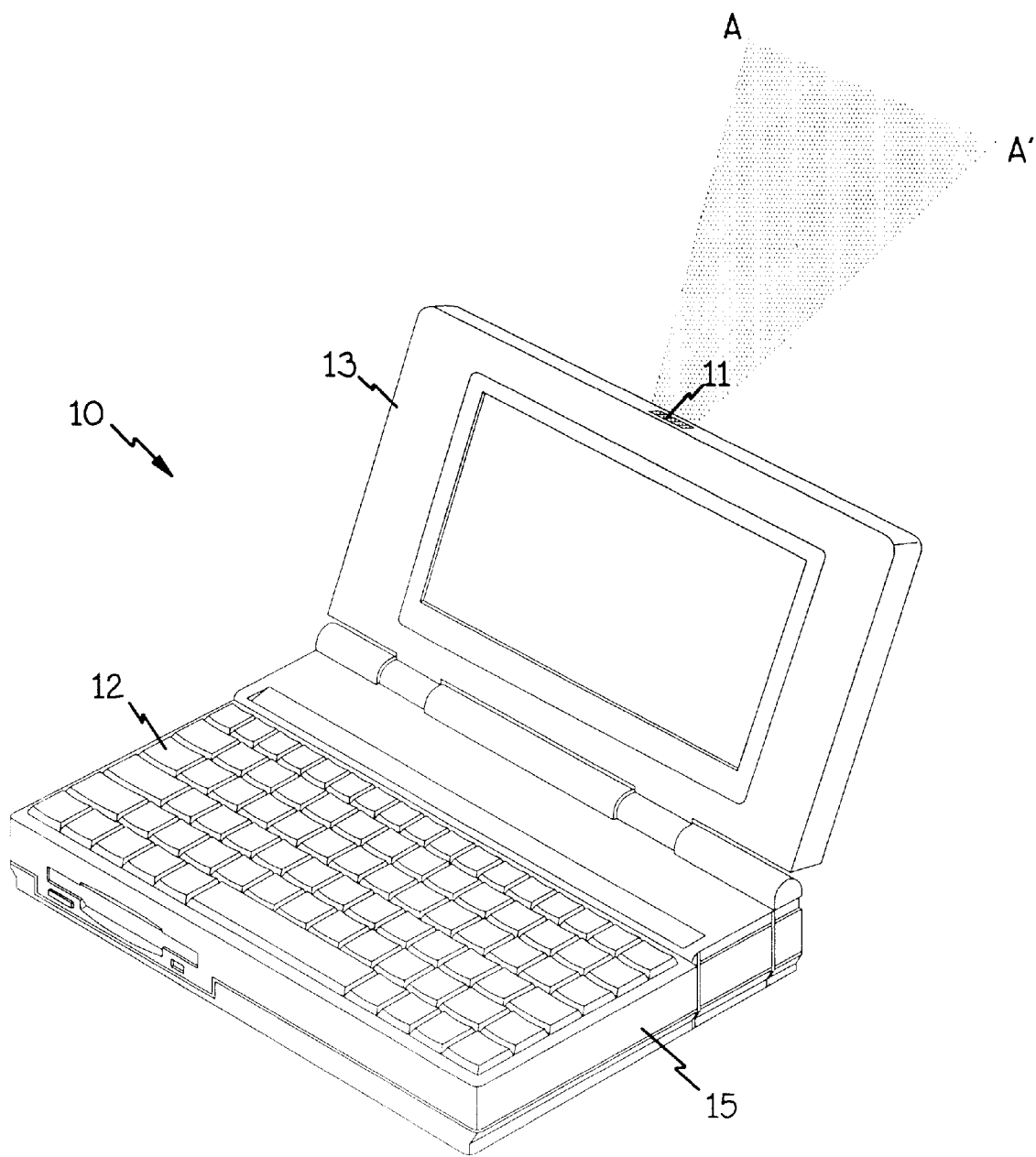
FIG. 1 illustrates a portable computer using a typical infrared transceiver unit for communicating with peripheral devices over an infrared communication link.

Referring now to the drawings and particularly to FIG. 1, which illustrates a portable computer 10 using an infrared transceiver unit 11 for communicating with peripheral devices or other computer systems over an infrared communication link. As shown in FIG. 1, the portable computer includes a main body 15, a keyboard 12, a cover 13 bearing a liquid crystal display (LCD) screen. The main body 15 contains therein the usual central processing unit (not shown) and auxiliary memory devices such as a 3.5" floppy disk drive and hard disk drive, and has hinge portions installed at a rear end of its top surface for pivotally mounting the cover 13 to the rear end such that the cover 13 is pivotable between an open position in which the LCD screen is exposed for use and a closed position in which the cover 13 covers the top surface of the main body 15. The infrared transceiver unit 11 is included in the main body 15 extending to the cover 13 for transmitting and receiving an infrared signal to a singled designated or designated ones of peripheral devices or other computer systems over an infrared communication link.

Figure 2:
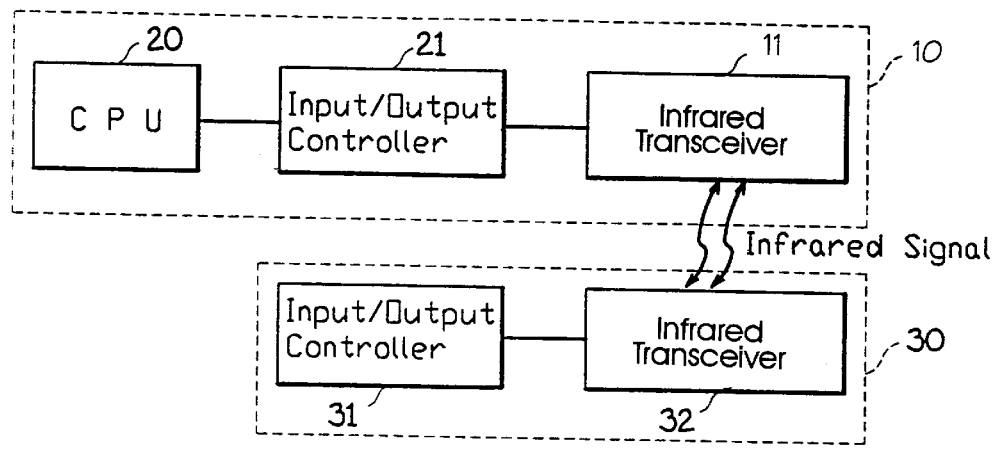
FIG. 2 is a block diagram of the portable computer including an infrared transceiver unit in wireless communication with a peripheral device having the same infrared transceiver unit as shown in FIG. 1.

FIG. 2 is a block diagram of the portable computer 10 including an infrared transceiver unit 11 as shown in FIG. 1 in wireless communication with a peripheral device 30 or another computer system having the same infrared transceiver unit 32. As shown in FIG. 2, the portable computer 10 includes a central processing unit (CPU) 20 for processing typical data, an input/output controller 21 for controlling input/output of an infrared transceiver unit 11 for transmitting and receiving an infrared signal bearing data information for wireless communication with a designated peripheral device 30 over an infrared communication link. The peripheral device 30 also has at least an infrared transceiver unit 32 as well as an input/output controller 31 for wireless communication with the portable computer 10.

The operation of the portable computer 10 and the peripheral device 30 using respective infrared transceiver units 11 and 32 is now described with reference to FIGS. 1 and 2 as follows.

First, the user issues a command signal through a keyboard 12 of the portable computer 10, and a command signal is processed by the CPU 20. The CPU 20 then generates a processed signal to the input/output controller 21 for controlling the infrared transceiver unit 11 in order to transmit an infrared signal bearing data information for communication with another peripheral device 30 having the same infrared transceiver unit 32. The infrared signal is transmitted through the infrared transceiver unit 11 and is propagated through an infrared communication area A–A' as shown in FIG. 1. The infrared signal bearing data information is then received by the infrared transceiver unit 32 of the peripheral device 30 when the peripheral device 30 is within the infrared communication area A–A'. The infrared signal which is received by the infrared transceiver unit 32 of the peripheral device 30 is then input to the input/output controller 31 for operation.

However, as we have observed, most portable computers using infrared transceiver units for communication with peripheral devices require the user to manually control the direction and the position of the transceiver contained in each computer for data transmission and reception. This is because the transceiver of each peripheral device can receive an infrared signal only when it is within an infrared communication range of the portable computer. The difficulty for the user to manually control the receiving direction of an infrared signal is even more profound when the distance between the transmitter and the receiver of the portable computer and peripheral devices is far extended (for example, more than 1 meter).

Figure 3:
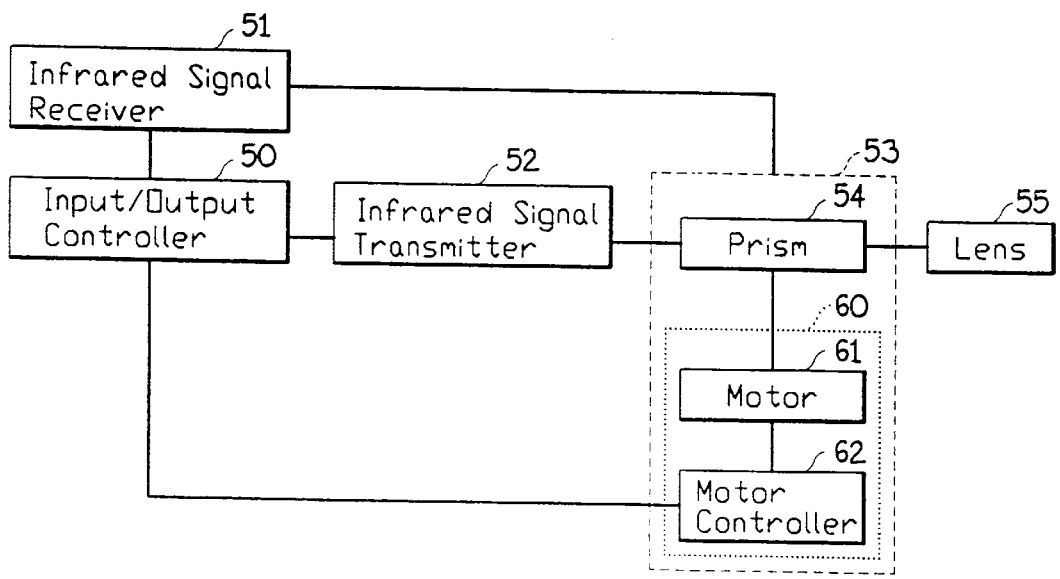
FIG. 3 is a block diagram of a portable computer for automatically controlling an infrared signal direction for wireless data communication with peripheral devices over an infrared (IR) communication link according to a preferred embodiment of the present invention.

Turning now to FIG. 3, which illustrates an infrared transceiver unit for wireless communication between a portable computer 10 and a designated peripheral device 30 according to a preferred embodiment of the present invention. The infrared transceiver unit constructed according to the present invention includes an input/output controller 50, an infrared signal receiver 51, an infrared signal transmitter 52, a lens 55, and an infrared signal direction controller 53 comprised of a prism 54, a prism driver 60 having a motor 61 and a motor controller 62 for controlling an infrared signal direction for transmission to the peripheral device 30 as well as reception from the peripheral device 30 over an infrared communication link.

When the user issues a command signal through a keyboard 12 of the portable computer 10, and the CPU 20 processes the command signal, the input/output controller 50 controls the infrared signal transmitter 52 to generate an infrared signal bearing data information. The infrared signal direction controller 53, which includes a prism 54 and a prism driver 60, is used to rotate the prism 54 to control the transmission direction of an infrared signal to the peripheral device 30 through the lens 55 over an infrared communication link. Likewise, the transmitting/receiving signal direction controller 53 also rotates the prism 54 to control the reception direction of an infrared signal transmitted from the peripheral device 30 over the infrared communication link.

In addition, the infrared signal direction controller 53 forms a feedback loop with the input/output controller 50 and the infrared signal receiver 51, and generates a feedback signal informing an infrared signal direction for transmission to the peripheral device 30 as well as reception from the peripheral device 30 so that the portable computer 10 is able to automatically control an infrared signal direction for maximum data transfer efficiency without the user's intervention.

When the feedback signal is received by the infrared signal receiver 51, the input/output controller 50 determines that the transmission of an infrared signal is completed. The feedback signal is not generated and, therefore, cannot be fed back to the infrared signal receiver 51 when the peripheral device 30 does not receive the infrared signal transmitted from the portable computer 10 because the peripheral device is not positioned within an infrared communication area. When the peripheral device 30 receives the infrared signal transmitted from the portable computer 10, however, the peripheral device 30 may produce an additional receipt signal which may be fed back to the portable computer 10 over an infrared communication link.

The input/output controller 50 produces an infrared refraction control signal automatically and sends to the infrared signal direction controller 53. The infrared signal direction controller 53 refracts the infrared transmitting signal produced from the infrared signal transmitter 52 if the infrared signal direction controller 53 receives the infrared refraction control signal. If the peripheral device 30 receives the refracted infrared transmitting signal, the feedback signal is transmitted from the peripheral device 30. The input/output controller 50 receives the feedback signal through the infrared signal receiver 51, and controls the infrared signal direction controller 53 so that the infrared transmitting signal is no longer refracted.

It is preferable that the infrared signal may be continuously refracted when the feedback signal is not received, and the input/output controller 50 may produce a signal for stopping the operation ofthe infrared signal direction controller 53 when the feedback signal is input through the infrared signal receiver 51 from the peripheral device 30 in another preferred embodiment of the present invention. In addition, it is also preferable that a well-known light emitting diode may be used as the infrared signal transmitter 52 and a well-known light receiving diode may be used as the infrared signal receiver 51.

The infrared signal direction controller 53 includes a prism 54 for refracting the infracted transmitting signal, and a prism driver 60 for controlling the direction of the prism 54 according to an infrared refraction control signal. However, any device, which can control the direction of the prism 54 according to the infrared refraction control signal, may be used as the prism driver 60.

The prism driver 60 includes a motor 61 for rotating the prism 54 to control the refraction direction ofthe prism 54, and a motor controller 62 for driving the motor 61 according to the infrared refraction control signal. The motor 61 is rotated slowly so that the transmission and reception operation of the infrared signal is stably performed, and a bidirectional motor, which can rotate in two directions according to the signal from the input/output controller 50 may be used. More preferably, a lens 55 may be formed in front of the prism 54 to disperse the refracted infrared transmitting signal.

Figure 4:
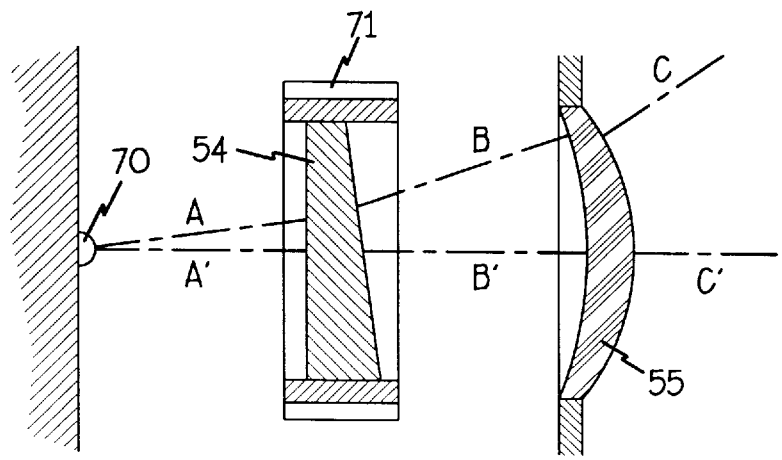
FIG. 4 is a side-sectional view of a refraction means of the infrared transceiver unit according to the preferred embodiment of the present invention.
Figure 5:
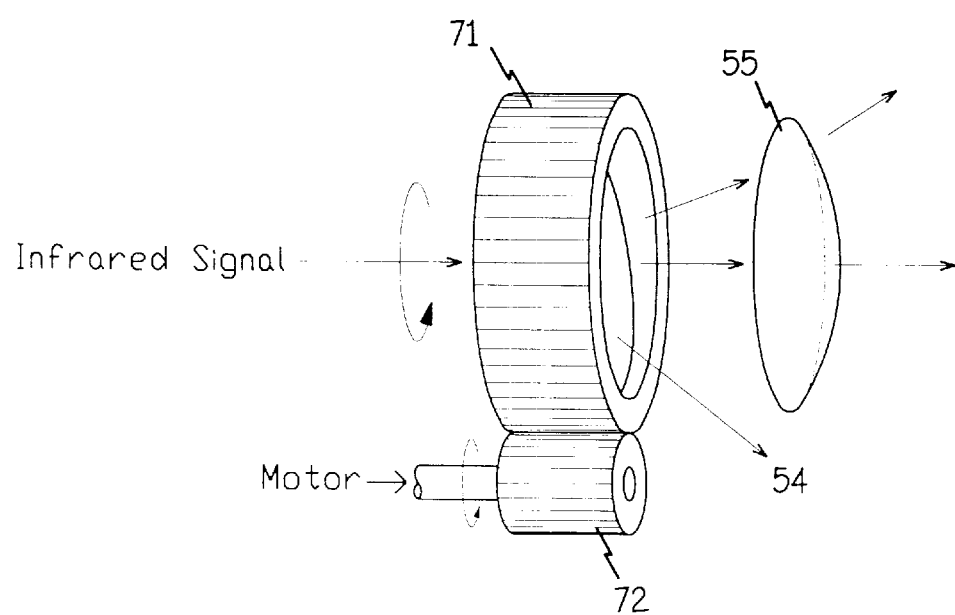
FIG. 5 is a perspective view of the refraction means of the infrared transceiver unit according to the preferred embodiment of the present invention.

FIGS. 4 and 5 illustrate construction and operation of an infrared transceiver unit of a portable computer 10 according to the preferred embodiment of the present invention. As shown in FIG. 4, for data transmission to the peripheral device 30 over an infrared communication link, a light emitting/receiving diode 70, which is part ofthe infrared signal transmitter 52, generates an infrared signal that propagates through an infrared communication area A–A'. The infrared communication area A–A' propagated from the light emitting diode 70 is refracted to an area B–B' through the prism 54, and the refracted infrared signal is dispersed to an infrared communication area C–C' through lens 55. If the peripheral device 30, which is designated to receive the infrared signal from the portable computer 10, does not exist within an infrared communication area C–C', the prism 54 is rotated by the prism driver 60 to refract the infrared region. A saw-toothed gear 71 is formed around the prism 54 for the driving operation in the preferred embodiment of the present invention. As shown in FIG. 5, the saw-toothed gear 71 is driven by a driving gear 72 connected to the motor 61. When the prism 54 is rotated by the driving operation, the refraction area B–B' of the infrared signal is varied so that the peripheral device 30 can receive the infrared signal transmitted from the portable computer 10. When a signal for driving the motor 61 is output from the motor controller 62, the motor 61 is designed to rotate the prism 54 at an angle of 360 degrees. If the prism 54 is rotated at the angle of 360 degrees, the infrared signal passing through the prism 54 is refracted at the angle of 360 degrees. The motor 60 is stopped in response to a stop signal if the directions of the infrared transmitter and the infrared receiver coincide with each other during the rotation operation for wireless communication.

For data reception from the peripheral device 30 over an infrared communication link, the light receiving diode 70 does not receive the infrared signal exactly if the direction of the infrared signal forms a proper angle with the infrared receiver. Here, the prism 54 and the motor controller 62 are formed in the front of the light receiving diode 70, and the prism 54 is rotated by the motor controller 62 so that an incident angle of the infrared signal entering the light receiving diode 70 is varied to receive the infrared signal. The motor 60 is driven until the infrared signal direction of the transmitter and the receiver coincide with each other also in this case. If the light receiving diode and the light emitting diode may serve as one refraction means if they are properly disposed, whereby the refraction means can refract the infrared transmitting signal and the infrared receiving signal.

Figure 6:
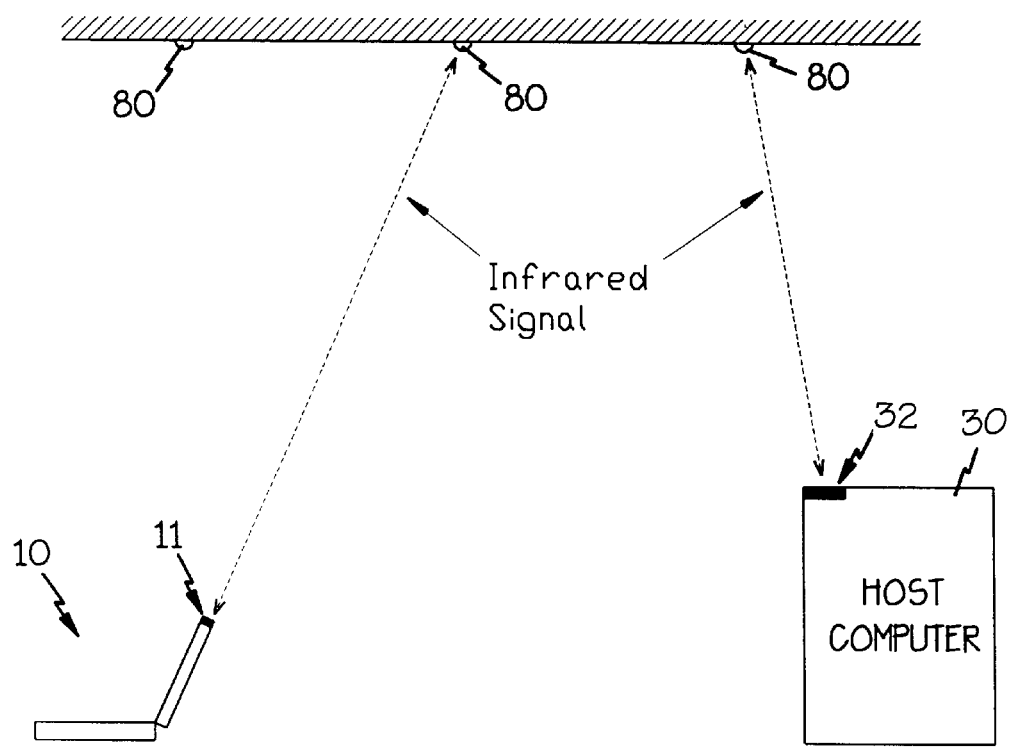
FIG. 6 is a schematic diagram of an infrared communication link between a portable computer and another electronic device such as a host computer according to the preferred embodiment of the present invention.

FIG. 6 is a schematic diagram of an infrared communication link between a portable computer and another electronic device such as a host computer according to the preferred embodiment of the present invention. The portable computer is positioned to automatically control an infrared signal direction for data transmission as well as data reception. As shown in FIG. 6, the infrared signal, which is transmitted from or received by the infrared transceiver unit 11 of the portable computer 10, is transmitted to the other peripheral devices such as a host computer 30 through a plurality of relay units 80 mounted in a ceiling of an office or an infrared communication area, and is then emitted from the relay unit 80 for reception by the infrared transceiver unit 11 of a host computer 30.

Figure 7:
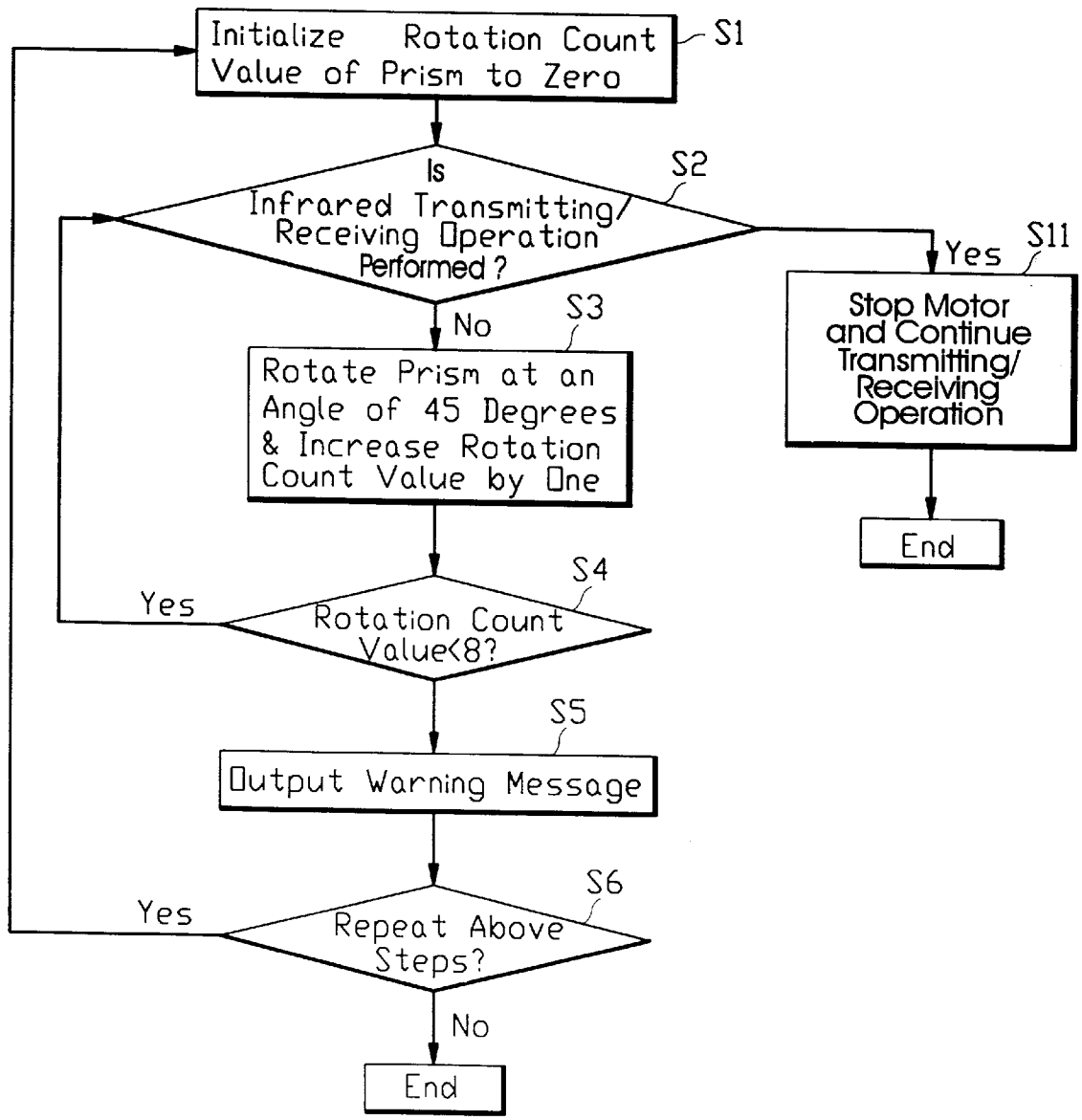
FIG. 7 is a flow chart of a process of transmitting/receiving an infrared signal according to a preferred embodiment of the present invention.

Now, the process of controlling an infrared signal direction for wireless communication between a portable computer 10 and a designated peripheral device 30 will be described in detail with reference to FIGS. 3 and 7 hereinbelow.

The input/output controller 50 produces an infrared signal bearing data information for driving the peripheral device 30 according to the command of the user and outputs the data to the infrared signal transmitter 52. The infrared signal transmitter 52 generates an infrared signal transmitting signal according to the infrared signal transmitting data, and outputs the signal to the peripheral device 30 (not shown) through the prism 54. Here, the motor controller 62 initializes a rotation count value to zero according to a rotation degree of the prism 54 in order to set an early position of the prism 54 at step SI as shown in FIG. 7. Next, the input/output controller 50 determines whether transmitting/receiving operation of an infrared signal is performed through the prism 54 at step S2. The determination operation is explained as follows. When the peripheral device 30 receives the infrared transmitting signal, the peripheral device 30 performs the operation according to the infrared transmitting signal, and the operation result is fed back to the infrared transceiver unit 32 for data communication over an infrared communication link. The feedback signal is for informing the infrared transceiver unit 32 of the present invention that the peripheral device 30 receives the infrared transmitting signal. Accordingly, the peripheral device 30 produces an additional receipt completion signal according to characteristics of the peripheral device 30 and the receipt completion signal may be fed back to the infrared transceiver unit of the present invention when the peripheral device 30 receives the infrared transmitting signal. The feedback signal is received by the infrared signal receiver 51 of the infrared transceiver unit. When the feedback signal is received, the input/output controller 50 determines that the transmission of the signal is finished. If the transmitting/receiving operation is performed as described above, the motor controller 62 does not drive the motor 61.

However, the infrared signal receiver 51 does not receive the feedback signal when the peripheral device 30 does not receive the infrared transmitting signal since the infrared signal is output from the infrared transceiver unit of the present invention but the peripheral device 30 does not exist within the infrared communication area. The motor controller 62 controls the motor 61 to rotate the prism 54 at the angle of 45 degrees and increases the rotation count value of the prism 54 by one when the infrared signal is not transmitted/received at step S3.

The motor controller 62 next determines whether the rotation count value is less than a discrete value of eight (8) at step S4. If the rotation count value is less than eight, the motor controller 62 returns to step S2 to determine whether the transmitting/receiving operation of the infrared signal is performed. Here, the motor controller 62 stops the operation of the motor 61 and continues to perform the transmitting/receiving operation of the infrared signal at step S11, when the transmitting/receiving operation of the infrared signal is performed at step S2. The motor controller 62 controls the motor 61 to rotate the prism 54 at the angle of 45 degrees and increases the rotation count value of the prism 54 by one when the transmitting/receiving operation of the infrared signal is not performed. The operation is continued until the rotation count value of the prism 54 is no longer less than eight (8) at step S4. A warning message is then output for the user to check whether the portable computer 10 is positioned not to transmit/receive the infrared signal at step S5. The above-mentioned operations may be repeated according to the command of the user after step S6.

The motor 61 rotates the prism 54 at the angle of 360 degrees in 45 degree intervals when the signal for driving the motor 61 is output from the motor controller 62 in the preferred embodiment of the present invention, but the rotation angle is not limited to 45 degree intervals. When the prism 54 is rotated at the angle of 360 degrees, the infrared signal passing though the prism 54 is also controlled at the angle of 360 degrees. In addition, the motor 61 is stopped in response to the stop signal outputted from the motor controller 62 when the direction of the infrared transmitter and the infrared receiver coincide with each other during the rotation operation.

Figure 10A:
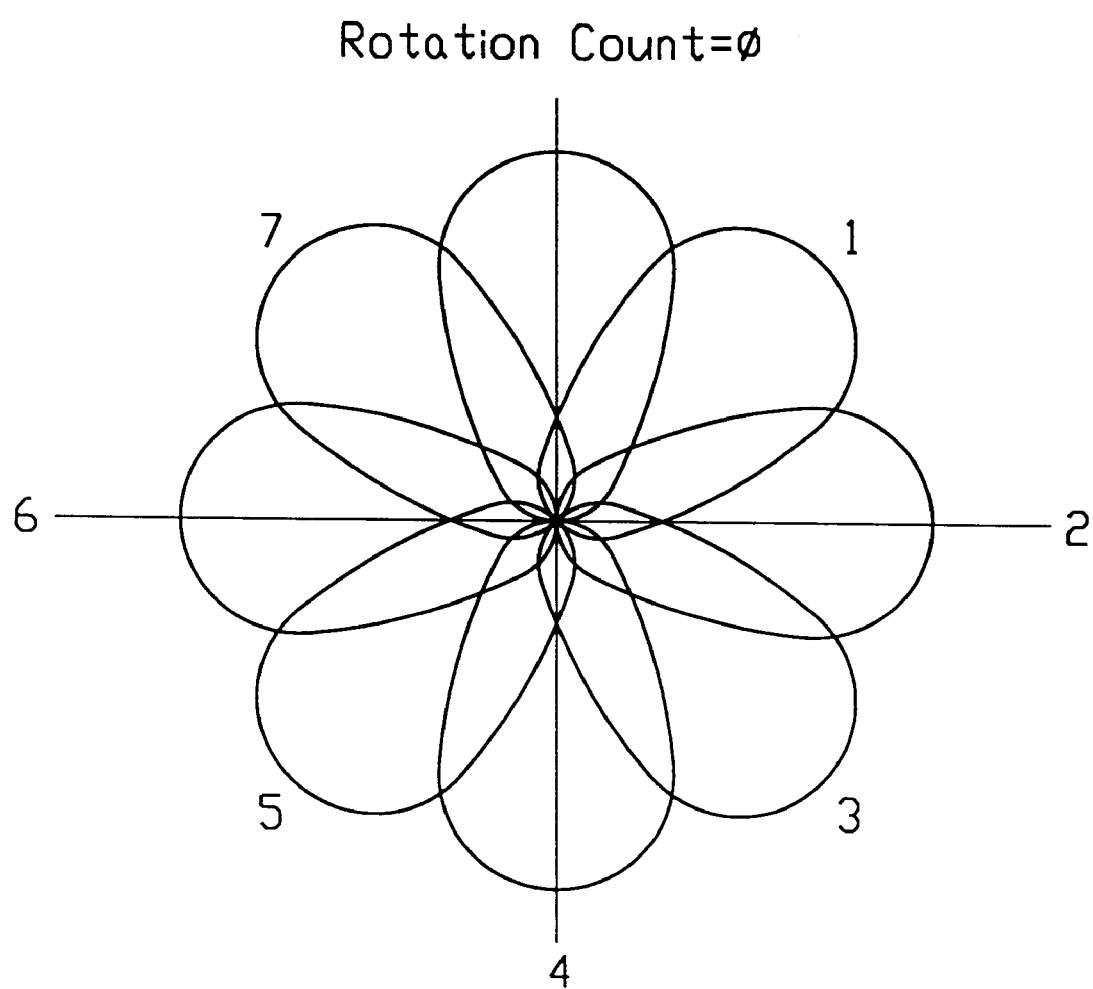
FIG. 10A illustrates an infrared signal area formed by the process of transmitting/receiving an infrared signal according to the preferred embodiment of the present invention.
Figure 10B:
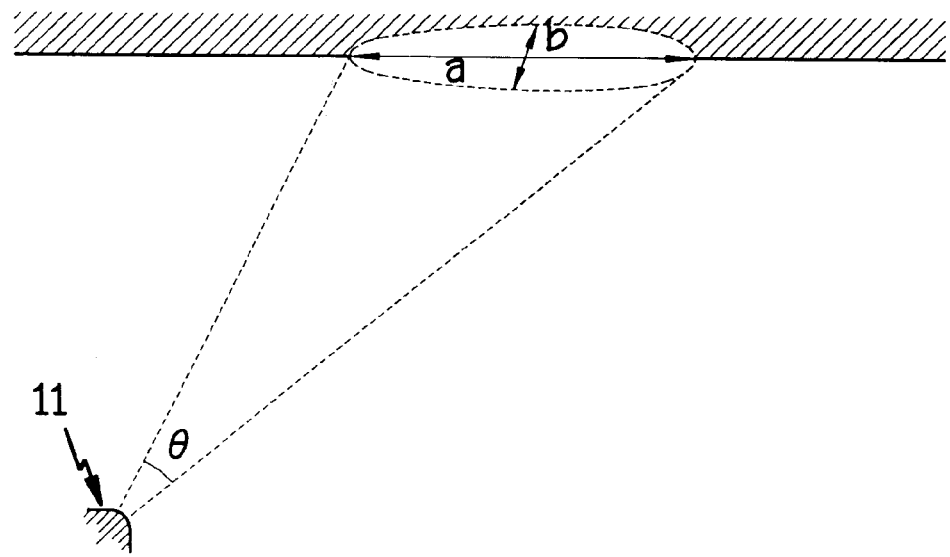
FIG. 10B illustrates an infrared signal area of the portable computer for automatically controlling an infrared signal direction according to the preferred embodiment of the present invention.
Figure 11:
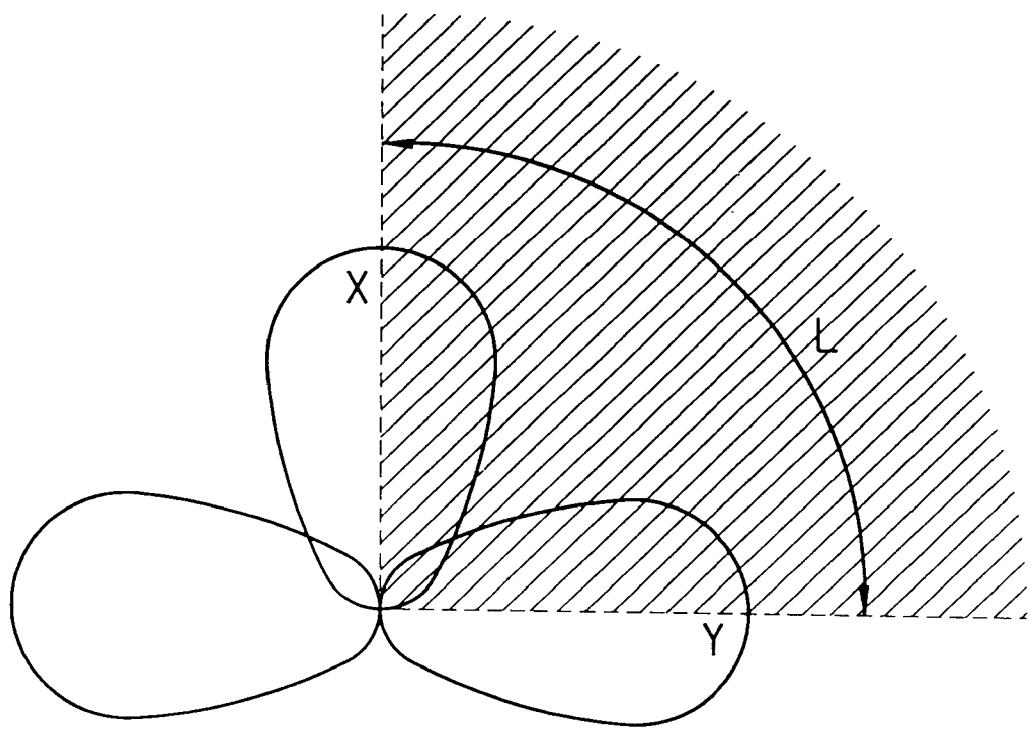
FIG. 11 illustrates a transmitting/receiving possible area in an infrared signal area formed by the process of transmitting/receiving an infrared signal according to the preferred embodiment of the present invention.

FIGS. 10A and 10B are views of the infrared communication area formed as described above. FIG. 10A is the view of the infrared communication area formed by the method for transmitting/receiving an infrared signal according to the preferred embodiment of the present invention. In FIG. 10A, the shape of the emitted infrared area is rotated centering on a predetermined central point as the prism is rotated. FIG. 10B is the view of the infrared communication area from the portable computer 10 which is able to automatically control an infrared transmitting/receiving signal direction according to the preferred embodiment of the present invention. In FIG. 10B, the circular infrared shape is transmitted in an ecliptic shape as it passes through the prism since the enlargement ratios of a horizontal axis and a vertical axis are different from each other. In FIG. 10B, a refraction angle θ is determined by refractivity of the prism. It is preferable that the angle corresponding to a long axis, a, in the infrared area is about 90 degrees and the angle corresponding to a short axis, b, in the infrared area is about 60 degrees.

Figure 8:
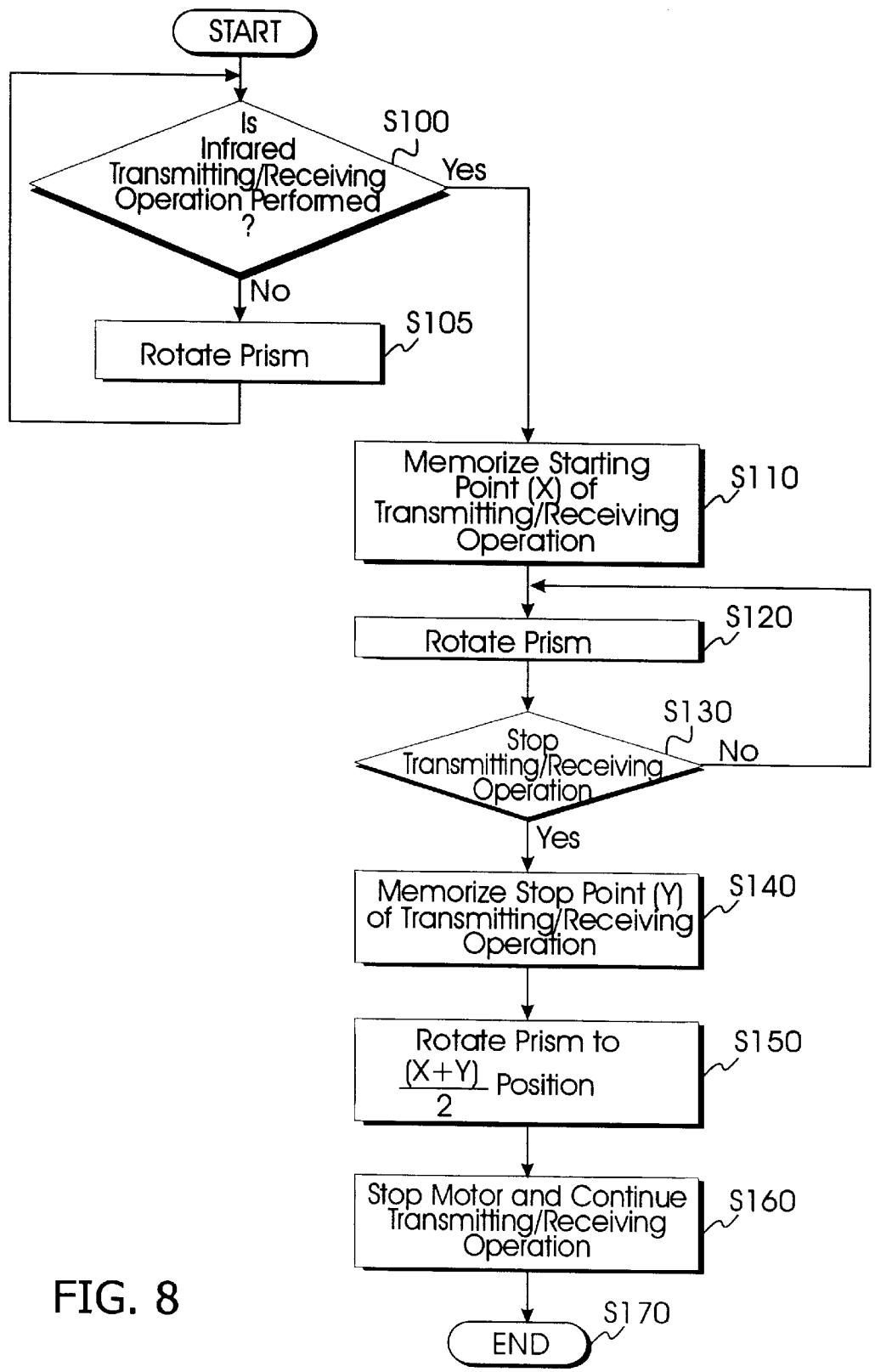
FIG. 8 is a flow chart of a process of transmitting/receiving an infrared signal according to another preferred embodiment of the present invention.

FIG. 8 is a flow chart of a method for transmitting/receiving an infrared signal according to another preferred embodiment of the present invention. The infrared transceiver unit 32 of the peripheral device 30 is positioned in the central portion of the infrared signal diffused by the prism 54, whereby the continuous communication is made even when the portable computer 10 or the s peripheral device 30 is moved at a certain degree. As shown in FIG. 8, the input/output controller 50 determines whether the infrared signal, which passes through the prism 54, is transmitted to the infrared transceiver unit 32 of the peripheral device 30 at step S100. The prism 54 is continuously rotated when the infrared signal is not transmitted to the peripheral device 30 at step S105. The motor controller 62 memorizes a starting point X of the transmitting/receiving operation which is a rotation angle of the prism 54 when the infrared signal is transmitted to the peripheral device at step S110. The motor controller 62 rotates the prism 54 until the transmitting/receiving operation of the infrared signal is stopped at steps 120 and 130. The motor controller 62 memorizes a rotation angle Y of the prism 54 at step S140 when the transmitting/receiving operation of the infrared signal is stopped, and controls the rotation angle of the prism 54 to be positioned between X and Y, preferably (X+Y)/2 by driving the motor 61 at step S150.

As described above, the infrared transceiver unit is positioned in the central portion of the infrared signal diffused by the prism 54 so that the transmitting/receiving operation between the portable computer and the peripheral device can be made even when the portable computer 10 or the peripheral device 30 is moved at the certain degree. When the infrared transceiver unit is positioned in the central portion of the infrared signal, the motor 61 is stopped, the transmitting/receiving operation of the infrared signal is continuously performed, and the operation ofthe motor controller 62 is ended at step S170.

Figure 9:
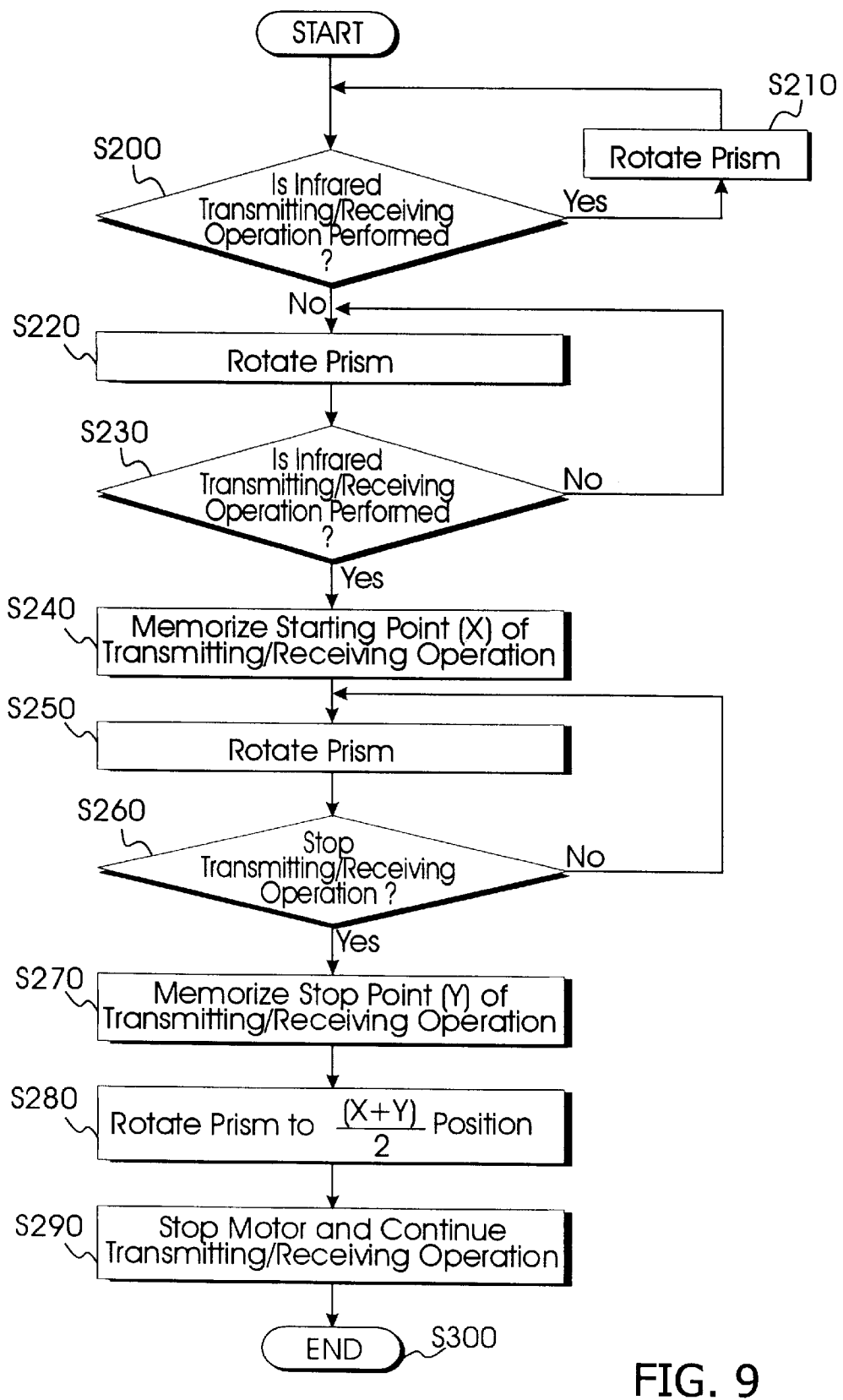
FIG. 9 is a flow chart of a process of transmitting/receiving an infrared signal according to still another preferred embodiment of the present invention.

FIG. 9 is the flow chart of a method for transmitting/receiving the infrared signal according to still another preferred embodiment of the present invention. This embodiment is to prevent the portable computer from miscalculating X, the starting point of the transmitting/receiving operation when the infrared signal is received by the infrared transceiver unit 32 of the peripheral device 30 at an earlier time.

As shown in FIG. 9, the input/output controller 50 determines whether the infrared signal, which passes through the prism 54, is transmitted to the infrared transceiver unit 32 of the peripheral device 30 at step S200. The prism 54 is continuously rotated when the infrared signal is transmitted to the peripheral device 30 at step S210, wherein the prism 54 is rotated to a position in which the infrared signal is not received by the peripheral device 30 at step S220. The input/output controller 50 determines whether the transmitting/receiving operation of the infrared signal is possible at step S230, and the prism 54 is again rotated at step S220 in order to find out the starting point X of the transmitting/receiving operation. The motor controller 62 memorizes the starting point X of the transmitting/receiving operation which is the rotation angle of the prism 54 when the transmitting/receiving operation of the infrared signal is performed at step S240. The motor controller 62 rotates the prism 54 until the transmitting/receiving operation of the infrared signal is stopped at steps 250 and 260. The motor controller 62 memorizes the rotation angle Y of the prism 54 at step S270 when the transmitting/receiving operation of the infrared signal is stopped, and controls the rotation angle of the prism 54 to be positioned between X and Y, preferably (X+Y)/2 by driving the motor 61 at step S280.

As described above, the infrared transceiver unit (for reception) is positioned in the central portion of the infrared signal diffused by the prism 54, wherein the transmitting/receiving operation between the portable computer 10 and the peripheral device 30 can be made even when the portable computer 10 or the peripheral device 30 is moved at the certain degree. When the infrared transceiver unit is positioned in the central portion of the infrared signal, the motor 61 is stopped, the transmitting/receiving operation of the infrared signal is continuously performed at step S290, and the operation of the motor controller 62 is ended at step S300.

FIG. 1 illustrates an area L between the starting point X of the transmitting/receiving operation and a stop point Y of the transmitting/receiving operation in the infrared communication area which may be formed by the method for transmitting/receiving an infrared signal according to the present invention, and the transmitting/receiving operation of the infrared signal is performed in the area L.

Figure 12:
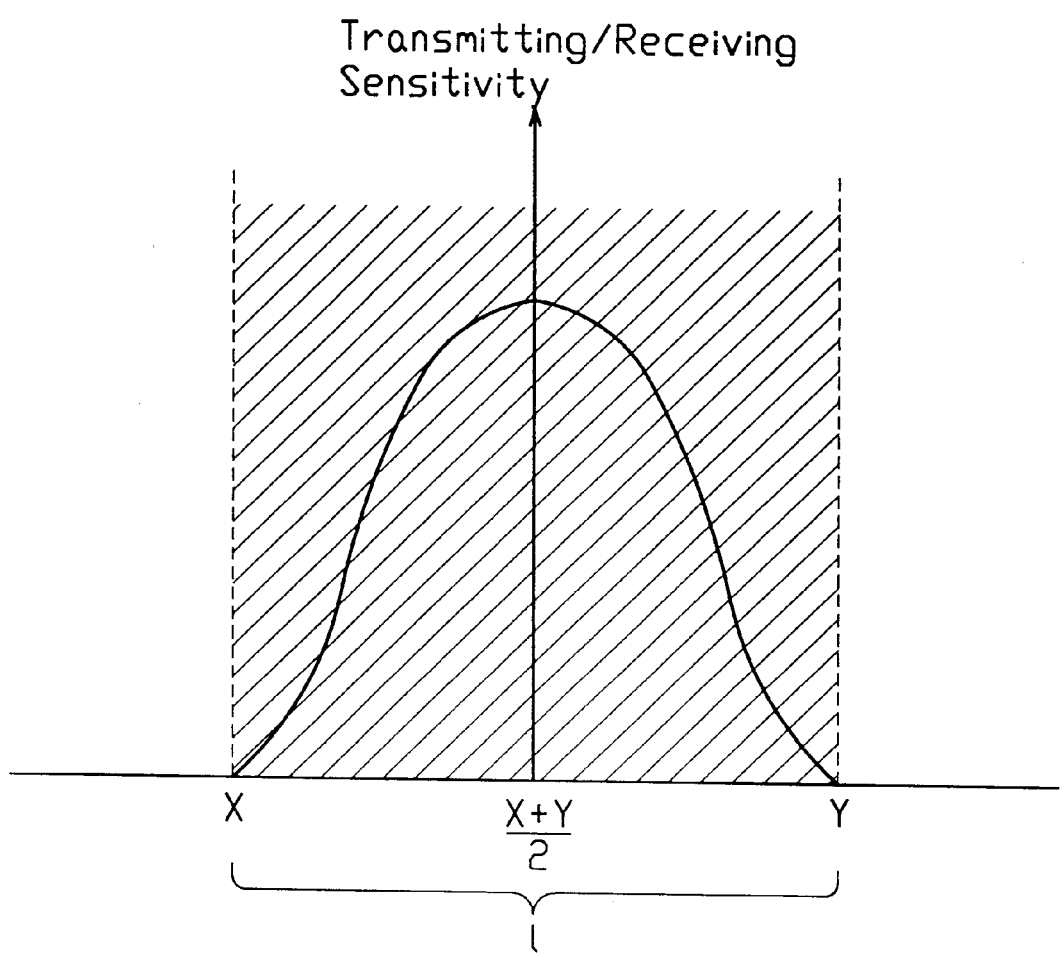
FIG. 12 illustrates a transmitting/receiving sensitivity of an infrared signal according to a position of an infrared direction controller in the portable computer according to the preferred embodiment of the present invention.

FIG. 12 illustrates a transmitting/receiving sensitivity of an infrared signal according to the position ofthe infrared direction controller in a method for transmitting/receiving the infrared signal according to the present invention. In FIG. 12, the transmitting operation is started from the transmitting starting point X, and the transmitting/receiving sensitivity increases gradually, being maximized at the point of (X+Y)/2. The transmitting/receiving sensitivity decreases gradually, and the transmitting/receiving operation is not performed at the transmitting stop point Y.

In the preferred embodiment of the present invention, peripheral devices include printers, modems, graphics, scanners, text scanners, code readers, magnetic card readers, monitors, voice command interfaces, external storage devices, keyboards, host computers, televisions etc. . . . In addition, the peripheral devices also include devices which can be operated wirelessly by the infrared signal. The transmitting/receiving operation of the infrared signal is possible by mounting the infrared signal transmitting/receiving device for data communication in the peripheral devices as well as the portable computer, a personal computer and so on, regardless of the position and the angle of the peripheral device and the devices controlled by the user.

As described above, the infrared signal transceiver unit for data communication can automatically control the infrared signal direction of the transmitter/receiver by refracting the infrared signal in order to control the direction of the infrared signal between the transmitter and the receiver in the portable computer for transmitting/receiving the infrared data, instead of a user-active type having the difficulty with operating the device. Accordingly, it is very convenient for the user, especially a beginner, to use the device, and the transmitting/receiving direction of the infrared signal is exact.

While there have been illustrated and described what are considered to be preferred embodiments of the present invention, it will be understood by those skilled in the art that various changes and modifications may be made, and equivalents may be substituted for elements thereof without departing from the true scope of the present invention. For example, while communication link between the portable computer and peripheral devices is preferably an infrared communication link, a radio frequency (RF) link, a sonic link, a lightwave link, a passive RF link or any wireless communication link can be utilized. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. In a portable computer having a liquid crystal display (LCD) module and an infrared communication device (IRCD) for wireless communication between the portable computer, a peripheral device, and other computers over an infrared communication link, said IRCD located on the LCD module and comprising:

an input/output controller having means for outputting infrared signal transmission data according to an input command, for receiving infrared signal reception data, and for outputting an infrared refraction control signal according to whether the infrared signal reception data is received;

an infrared signal transmitter having means for transmitting an infrared transmission signal according to the infrared signal transmission data to the peripheral device over said infrared communication link;

an infrared signal receiver having means for receiving an infrared reception signal from the peripheral device and for outputting the infrared signal reception data; and an infrared signal direction controller having means for controlling the direction of the infrared transmission signal to the peripheral device, and the direction of the infrared reception signal according to said infrared refraction control signal;

the improvement comprising: an IRCD-controlling means for automatically controlling the direction of the infrared transmission signal to the peripheral device and the direction of the infrared reception signal to maximize signal transmission and reception efficiency without human intervention, wherein said IRCD-controlling means comprises:

a prism for refracting the infrared transmission signal and the infrared reception signal; and a prism driver means for automatically changing the direction of the prism according to the infrared refraction control signal.

2. The portable computer of claim 1, wherein said prism driver means comprises a motor for changing the direction of the prism, and a motor controller for driving the motor according to the infrared refraction control signal and a servo loop.

3. The portable computer of claim 2, further comprising a lens for diffusing and dispersing the refracted infrared transmission signal, in a manner such that said signal is dispersed over a wider area, has a greater variation in intensity over its range of dispersion, and is thereby more adapted to application in a servo loop as input for a position sensor.

4. The portable computer of claim 1, further comprising a lens for diffusing and dispersing the refracted infrared transmission signal, in a manner such that said signal is dispersed over a wider area, has a greater variation in intensity over its range of dispersion, and is thereby more adapted to application in a servo loop as input for a position sensor.

5. The portable computer of claim 1, further comprising a lens for diffusing and dispersing the refracted infrared transmission signal, in a manner such that said signal is dispersed over a wider area, has a greater variation in intensity over its range of dispersion, and is thereby more adapted to application in a servo loop as input for a position sensor.

6. In a method for controlling an infrared signal direction in a computer system having an infrared signal direction controller for performing transmission/reception operations with external devices by controlling the infrared signal direction, said method comprising the steps of:

(1) determining whether a transmission/reception operation of an infrared signal is performed through said infrared signal direction controller;

(2) controlling said infrared signal direction controller to rotate the transmission/reception direction of the infrared signal at a certain degree when the infrared signal is not transmitted/received over an infrared communication link between the computer system and said external devices; and (3) performing the transmission/reception operation of the infrared signal when the infrared signal is transmitted/received over said infrared communication link between the computer system and said external devices, the improvement comprising: a step for automatically controlling said infrared signal direction in such a manner as to maximize signal transmission/reception efficiency without human intervention, said step effectuated by means of a servo motor driven prism which rotates the transmission/reception direction of the infrared signal in accordance with an intensity of the received infrared transmission signal.

7. The method of claim 6, further comprising a step for outputting an error message when the infrared signal is not transmitted/received over said infrared communication link even after the transmission/reception direction of the infrared signal is rotated at the certain degree.

8. A method for controlling an infrared signal transmission/reception direction in a computer system having an infrared signal direction controller for performing transmission/reception operations with external devices by controlling the infrared signal direction automatically, said method comprising the steps of:

(1) automatically controlling said infrared signal direction controller to automatically control the direction of the infrared signal, without human intervention, until the transmission/reception operation of the infrared signal is performed, said step effectuated by means of a servo motor driven prism which rotates the transmission/reception direction of the infrared signal in accordance with an intensity of the received infrared transmission signal;

(2) automatically storing a first position in which the transmission/reception operation of the infrared signal is performed;

(3) automatically controlling said infrared signal direction controller to automatically control the direction of the infrared signal, without human intervention, until the transmission/reception operation of the infrared signal is stopped;

(4) automatically storing a second position in which the transmission/reception operation of the infrared signal is stopped; and (5) automatically controlling said infrared signal direction controller to ensure the direction of the infrared signal automatically be positioned between the first position and the second position for wireless communication over an infrared communication link, without human intervention.

9. The method of claim 8, wherein said infrared signal direction controller automatically controls the direction of the infrared signal between a half of the first position and the second position during the step of automatically controlling the direction of the infrared signal between the first position and the second position.

10. The method of claim 9, further comprising a step of automatically controlling the transmission/reception operation of the infrared signal not to be performed by rotating the infrared signal direction controller when the infrared signal is transmitted/received over an infrared communication link between the computer system and said external devices, after determining whether the transmission/reception operation of the infrared signal is performed through the infrared signal direction controller before above steps.

* * * * *